United States Patent
Heinen (10) Patent No.: US 9,622,053 B1
(45) Date of Patent: Apr. 11, 2017

(54) METHODS AND APPARATUS FOR ENHANCED TACTICAL RADIO PERFORMANCE

(71) Applicant: Raytheon Company, Waltham, MA (US)

(72) Inventor: Gregory W. Heinen, Lowell, MA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/948,955

(22) Filed: Nov. 23, 2015

(51) Int. Cl.
| H04B 1/38 | (2015.01) |
| H04W 4/12 | (2009.01) |
| G10L 15/26 | (2006.01) |
| G10L 15/01 | (2013.01) |
| G06F 17/28 | (2006.01) |

(52) U.S. Cl.
CPC ............ *H04W 4/12* (2013.01); *G06F 17/289* (2013.01); *G10L 15/01* (2013.01); *G10L 15/265* (2013.01)

(58) Field of Classification Search
None
See application file for complete search history.

(56) References Cited

U.S. PATENT DOCUMENTS

| 4,707,858 A | 11/1987 | Fette |
| 7,103,154 B1 | 9/2006 | Cannon et al. |
| 7,313,362 B1 | 12/2007 | Sainct |
| 7,493,129 B1 | 2/2009 | Mostafa et al. |
| 7,564,784 B2 | 7/2009 | Forssell et al. |
| 7,809,385 B2 | 10/2010 | Mostafa et al. |
| 7,937,119 B2 | 5/2011 | Arai |
| 8,060,154 B1 | 11/2011 | Bali et al. |
| 8,401,020 B2 | 3/2013 | Capone et al. |
| 8,494,855 B1 | 7/2013 | Khosla |
| 8,526,355 B2 | 9/2013 | Wang et al. |
| 8,676,881 B2 | 3/2014 | Chen et al. |
| 8,788,274 B1 | 7/2014 | Guzman |
| 2003/0115059 A1 | 6/2003 | Jayaratne |
| 2008/0025334 A1* | 1/2008 | Smith .................. H04L 1/1887 370/412 |
| 2010/0027768 A1 | 2/2010 | Foskett |
| 2010/0250231 A1 | 9/2010 | Almagro |
| 2013/0324189 A1* | 12/2013 | Katis .................. H04B 1/3888 455/553.1 |
| 2015/0019250 A1* | 1/2015 | Goodman .......... H04N 21/4227 705/2 |

FOREIGN PATENT DOCUMENTS

DE 3521413 A1 12/1986

OTHER PUBLICATIONS

"Agilent Understanding General Packet Radio Service (GPRS)" Application Note 1377, Agilent Technologies, Apr. 7, 2011, 32 pages. [submitted Nov. 30, 2015 with incorrect date].

(Continued)

*Primary Examiner* — Mohammed Rachedine
(74) *Attorney, Agent, or Firm* — Daly, Crowley, Mofford & Durkee, LLP (57) ABSTRACT

Methods and apparatus for tactical radios for receiving speech from a user in a microphone and converting the speech to text with a voice-to-text module. The radio provides the text to the user for verification by the user and receives an indication from the user for verification that the text corresponds to the speech. The radio then transmits the text.

19 Claims, 8 Drawing Sheets

(56) References Cited

OTHER PUBLICATIONS

Meyer, Michael. "TCP Performance over GPRS," Ericsson Eurolab Deutschland GmbH, Herzogenrath, Germany. Proceedings of the IEEE WCNC, 1999, 5 pages. [submitted Nov. 30, 2015 with incorrect date].
"Persistent Systems' Wave Relay—A True Lifesaver in Operations", Military Technology, MILTECH, Sep. 2013, 1 page.
Kutsor, Michael F.; "Application of UWB and MIMO Wireless Technologies to Tactical Networks in Austere Environments", Sep. 2010, Naval Postgraduate School Thesis, Monterey, CA, 119 pages.
Raytheon; "US Army Testing Demonstrates Readiness of Raytheon's Maingate Radio", Jan. 13, 2012, 3 pages.
Trent, Barry A. et al.; "Dynamics: Inverse Mission Planning for Dedicated Aerial Communications Platforms", MILCOM 2015, Oct. 26-28, 2015, Architecture Technology Corporation, Air Force Research Laboratory and Air Force LCMC, 12 pages.
PCT Search Report and Written Opinion of the ISA dated Oct. 14, 2016; for PCT/US2016/032044; 13 pages.
Selex Es: "Military Radio Relay MH 500 Series", dated Dec. 31, 2013, pp. 1-4.
"Agilent Understanding General Packet Radio Service (GPRS)" Application Note 1377, Agilent Technologies, Sep. 19, 2015, 32 pages.
Somarriba, Oscar. "Multihop Packet Radio Systems in Rough Terrain," Licentiate Thesis, Oct. 1995, Department of Signals, Sensors and Systems, Radio Communication Systems, Kungl Tekniska Hogskolan, Royal Institute of Technology, 96 pages.
Stephens, Donald R. et al. "Network Programming of Joint Tactical Radio System Radios," Joint Program Executive Office (JPEO), Joint Tactical Radio Systems, San Diego, CA. 978-1-4244-2677-5/ 08/2008, IEEE. 6 pages.
Meyer, Michael. "TCP Performance over GPRS," Ericsson Eurolab Deutschland GmbH, Herzogenrath, Germany. Sep. 19, 2015, 5 pages.
Rosenauer, Dennis. "The Layperson's Guide to High Speed Amateur Packet Radio," Sep. 19, 2015. 4 pages. ve7bpe@octoblob.rfnet.sfu.ca.

* cited by examiner

METHODS AND APPARATUS FOR ENHANCED TACTICAL RADIO PERFORMANCE

BACKGROUND

As is known in the art, tactical radios can have relatively high power consumption that can affect data reliability, range, and power conservation. Conventional tactical radios do not typically employ so-called 'last ditch' capability, where link margin, transmission reliability and power are conserved. Known tactical radios do not employ capability to operate at extreme range and at maximum reliability or have a means to conserve power when transmission repeats or multiple hails are needed.

SUMMARY

The present invention provides method and apparatus for a radio having enhanced transmit information reliability by converting voice directly to text or ASCII data, which accumulates into a string of words. As used herein, text should be construed broadly to include any digital format after conversion of voice. In embodiments, the radio includes a display to enable a user to review and verify the text for the converted voice. After verification, the radio can send the message. For example, a special forces unit calling in close air support can verify text after voice conversion prior to transmission of the message. The data can be sent via the Soldier Radio Waveform (SRW), for example, and received, with one or mechanisms for verification, such as checksum, data return to originator for verification and confirmation, and the like.

Data content in spoken words is relatively small. With an average of 150 words per minute (wpm) average speech, at five letters per word, one minute of speech contains about 750 characters or 6000 bits, and 1 second contains 200 bits, or 200 bps. For a 12 kbps radio this amounts to 0.02 seconds, for a 1 MBPS radio this amounts to 1E-5 seconds or a 60-5000 reduction in band use. Power is also conserved from 60 to 5000 units, not including error checking and overhead. Power is conserved because significantly less power is used by the transmitter when transmitting converted voice than transmitting voice. It is understood that Last Ditch Voice relies on power conservation and repeated queries or hails.

In addition, link budget can be relaxed with sufficient amount of error correction, bandwidth reduction and power conservation since voice recognition is applied at the front end of the message flow. As power is conserved, there is more power level available for transmitting to allow the transmitter to remain at higher power levels over longer periods of time.

In embodiments, voice can be translated into another language at the user radio level and/or at the receiving radio. Received messages can be retransmitted from, for example, a command post, into another language. Multiple language translations can be stored and executed.

In one aspect of the invention, a method comprises: receiving speech from a user in a microphone of a tactical radio having a processor and memory; converting the speech to text with a voice-to-text module using the processor; providing the text to the user for verification by the user; receiving an indication from the user for verification that the text corresponds to the speech; and transmitting the text from the tactical radio.

The method can further include one or more of the following features: providing the text comprises displaying the text on a screen, providing the text comprises performing text-to-speech (TTS) for output from a loudspeaker, translating the text from a first language to a second language, performing last ditch operation for the text, periodically and/or randomly transmitting the text, receiving a message from a device that received the transmitted text and analyzing the message to confirm receipt of the text, the message includes a checksum corresponding to the text, detecting an error from the message from the device and retransmitting the text to the device, retransmitting the text until receiving a message indicating correct receipt of the text, performing cognitive processing of the text, and/or transmitting the text from the tactical radio and receiving a response from a further radio via an aircraft having relay capability.

In another aspect of the invention, a radio comprises: a processor and memory configured to receive speech from a user in a microphone of the radio; a converter module to convert the speech to text using the processor; a text output module to provide the text to the user for verification by the user; a verification module to receive an indication from the user for verification that the text corresponds to the speech; and an antenna to transmit the text from the radio.

The radio can further include one or more of the following features: the text output module is configured to format the text for display of the text on a screen, the text output module is configured to format the text for text-to-speech (TTS) output from a loudspeaker, a translator module to translate the text from a first language to a second language, an error module to receive a message from a device that received the transmitted text and analyze the message to confirm receipt of the text, the message includes a checksum corresponding to the text, and/or the processor and memory are configured to performing cognitive processing of the text.

In a further aspect of the invention, an article comprises: a non-transitory computer readable medium having stored instructions that enable a machine to: receive speech from a user in a microphone of a tactical radio having a processor and memory; convert the speech to text with a voice-to-text module using the processor; display the text to the user for verification by the user; receive an indication from the user for verification that the text corresponds to the speech; and transmit the text from the tactical radio.

The article can further include one or more of the following features: providing the text comprises displaying the text on a screen, providing the text comprises performing text-to-speech (TTS) for output from a loudspeaker, translating the text from a first language to a second language, performing last ditch operation for the text, periodically and/or randomly transmitting the text, receiving a message from a device that received the transmitted text and analyzing the message to confirm receipt of the text, the message includes a checksum corresponding to the text, detecting an error from the message from the device and retransmitting the text to the device, retransmitting the text until receiving a message indicating correct receipt of the text, performing cognitive processing of the text, and/or transmitting the text from the tactical radio and receiving a response from a further radio via an aircraft having relay capability.

BRIEF DESCRIPTION OF THE DRAWINGS

The foregoing features of this invention, as well as the invention itself, may be more fully understood from the following description of the drawings in which.

DETAILED DESCRIPTION

Figure 1:
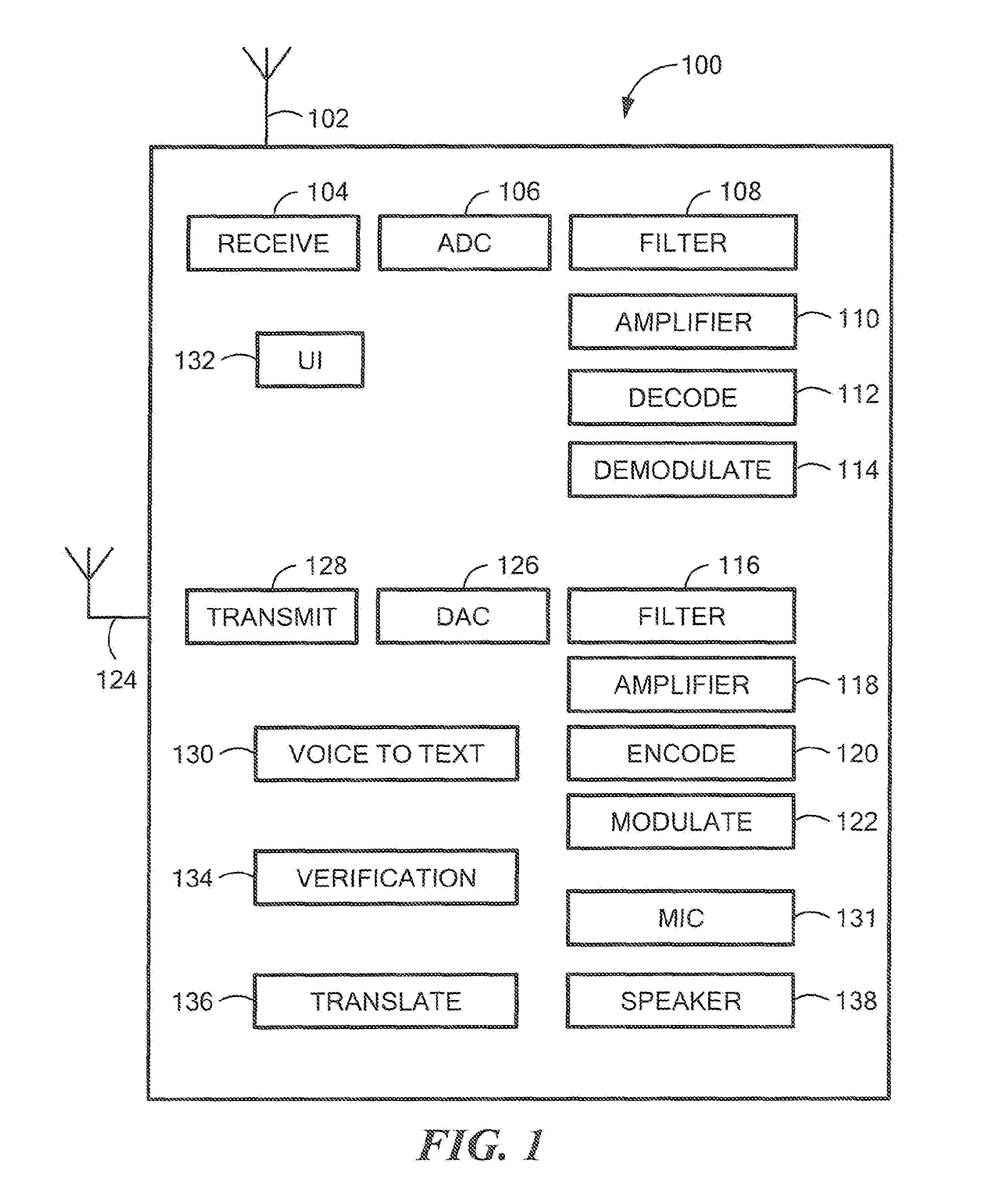
FIG. 1 is a schematic representation of a tactical radio having voice to text and verification.

FIG. 1 shows a software defined radio system 100 in accordance with illustrative embodiments of the invention. The radio 100 includes a receive antenna 102 coupled to a receiver module 104, which provides an analog signal to an ADC 106, which digitizes the received signal. The radio 100 can include a conventional filter module 108, amplifier module 110, decoding module 112, and a demodulator module 114. Similarly, the transmit side can include a conventional filter module 116, amplifier module 118, encoder module 120, and modulator module 122. A transmit antenna 124 can be the same or different from the receive antenna. A DAC module 126 can generate an analog signal for a transmit module 128.

The radio 100 further includes a voice to text module 130 for converting speech received by a microphone module 131 to text and/or ASCII. A user interface module 132 can include a display screen that can display the text for the converted voice. A verification module 134 can receive a verification input (verified/incorrect) from the user, such as a touch screen of the display of the user interface 132. Upon receiving user verification, the text can be transmitted.

In embodiments, the radio 100 can include a translate module 136 to translate the voice and/or text into another language. Suitable voice-to-text applications include DRAGON SPEAK, VLINGO, GOOGLE VOICE, and TALK BOX and suitable available translation applications include ITRANSLATE, GOOGLE VOICE, NAVITA, and LEXIFON.

The radio system 100 can include a loudspeaker module 138 for generating sound that can be heard by a user. For example, the radio can receive messages that are sent to the loudspeaker 138. This arrangement can facilitate hands free operation. In embodiments, messaging can be voice, which can be recorded, and/or text.

Figure 2:
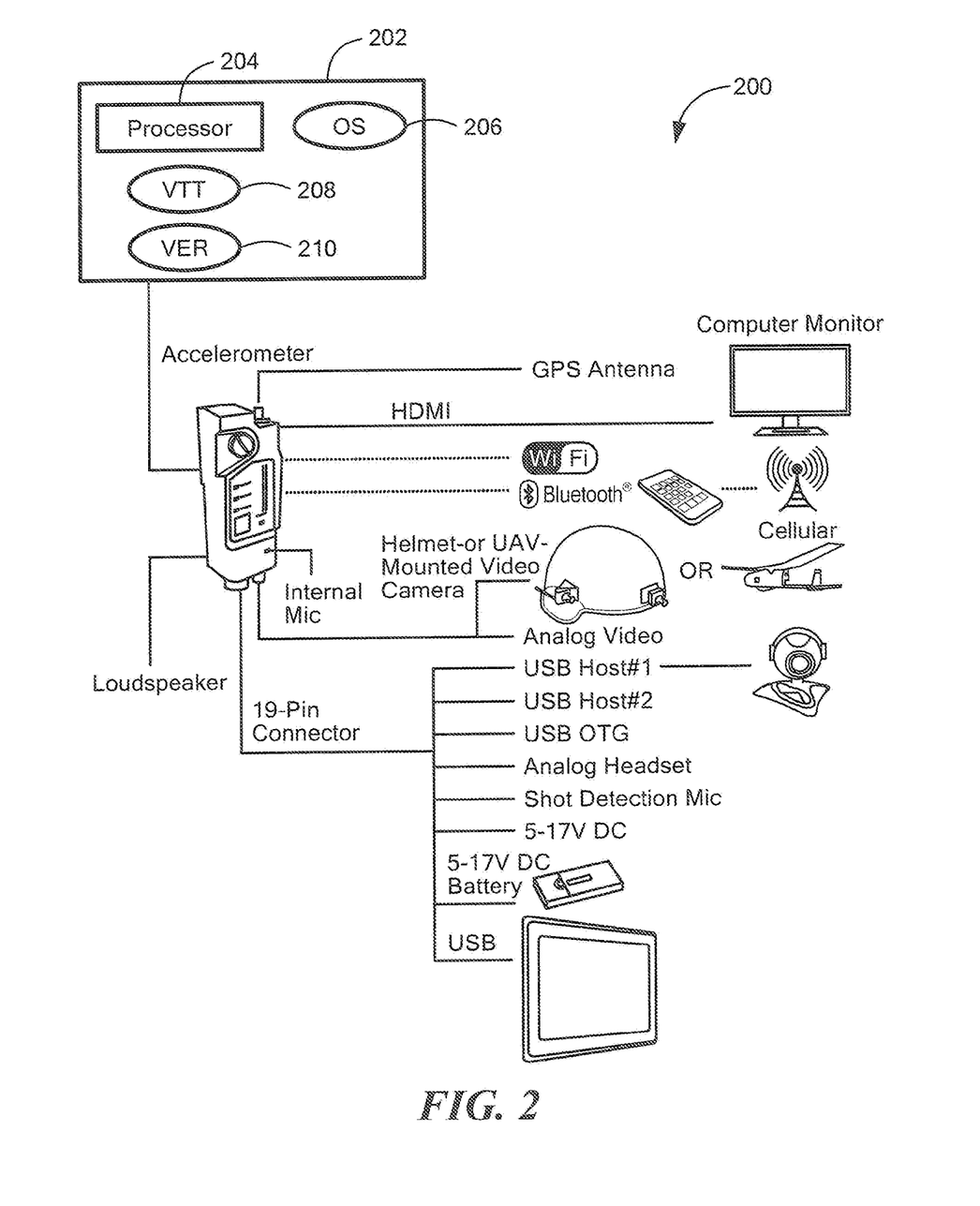
FIG. 2 is a schematic representation of a tactical radio having an application module with voice-to-text.

FIG. 2 shows an illustrative tactical radio 200 having an application module 202 that can perform voice to text and user verification, as described below. The radio 200 can include features such as an accelerometer, GPS antenna, monitor interface (HDMI), wireless connections, a microphone, loudspeaker, etc. In embodiments, the tactical radio uses the Soldier Radio Waveform (SRW) for transmitting and receiving data on VHF/UHF spectrum.

In embodiments, the application module 202 includes a dedicated processor 204 and operating system 206 to support applications including a voice-to-text (VTT) module 208 and verification module 210. It is understood that other modules can be included that control transmitting and retransmitting of data, such as the processing described below. In embodiments, a dedicated processor system can include an ARM CORTEX A8 DM3730 DAVINCI.

Figure 3:
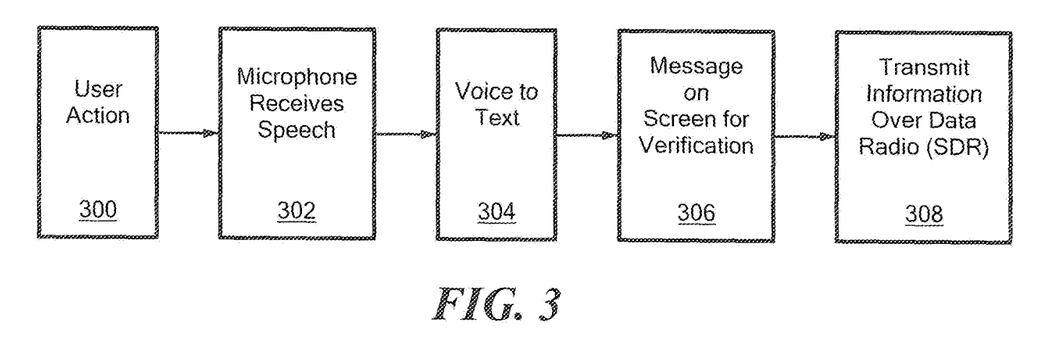
FIG. 3 is a flow diagram showing illustrative voice-to-text processing and user verification before transmission.

FIG. 3 shows an illustrative flow for voice-to-text with verification. In step 300, a user of a tactical radio takes some action to initiate sending of a message, such as preparing the radio to receive speech from the user. In step 302, a microphone on the radio receives user speech. In step 304, the speech is processed by a voice-to-text module to convert the speech to text, which is displayed on a screen in step 306 to enable the user to verify that the text accurately represents the user speech into the microphone. In an alternative embodiment, the radio performs text-to-speech (TTS) processing and sends the TTS for the speech to a loudspeaker to enable the user to listen to the loudspeaker output for verification of the speech originally input into the microphone. Upon verification, the user provides an indication to the radio. For example, the user can touch a specified location on the screen indicating text/message verification. In another embodiment, the user speaks a predetermined word, such as "verified" or "send message." In other embodiments, the user speaks into the microphone for natural language processing of the user speech. In step 308, the radio transmits the text as data (not voice).

It is understood that a variety of data types can be processed and transmitted by the radio manually by the user or automatically in accordance with a given protocol. For example, a security protocol may require identifying data, such as biometric data. Illustrative data types include text, image data, biodata, codes, sketch data, challenge response data, authentication data, etc.

It will be appreciated that in first responder, battlefield and other environments, transmission of biometric data with controlled distribution is desirable. Transmission of enemy combatant retina ID, voice and interrogation, face, and/or fingerprint, for example, is desirable. Distribution of this data over great range is possible via aerial communications platforms to control centers. However, transmitting biometric data and lengthy voice transmission via conventional channels requires significant power.

Figure 4:
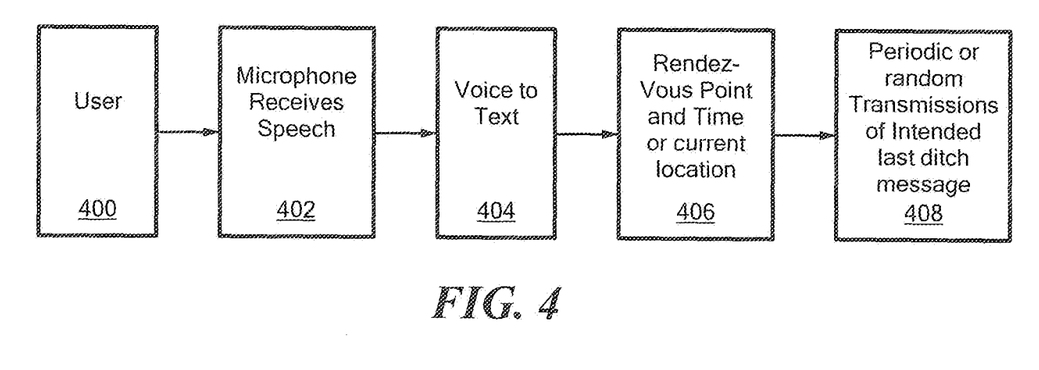
FIG. 4 is flow diagram showing illustrative voice-to-text processing and last ditch processing.

FIG. 4 shows an illustrative flow for last-ditch' radio operation. In step 400, a user takes some action to transmit a message. In step 402, a microphone receives speech from the user for processing from voice-to-text in step 404. In 406, the converted data includes, for example, a rendez-vous point, time, and/or current location. In embodiments, a message can include sensor information, such as GPS lat/lon, altitude, etc. In step 408, the radio transmits the data in a periodic or random manner in accordance with last-ditch operation. It will be appreciated that transmitting data converted from voice, as compared to voice, achieves significant power usage reduction. With this arrangement, last ditch messages can be transmitted with a higher likelihood of being received.

Figure 5:
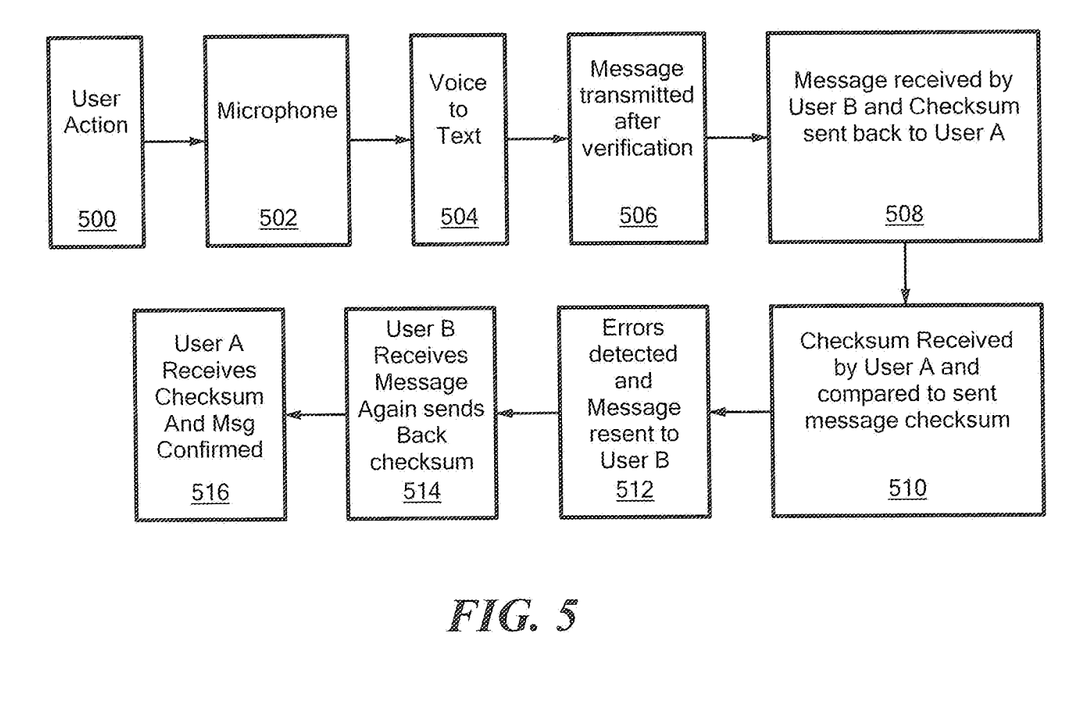
FIG. 5 is a schematic diagram showing illustrative voice-to-text and enhanced reliability.
Figure 5A:
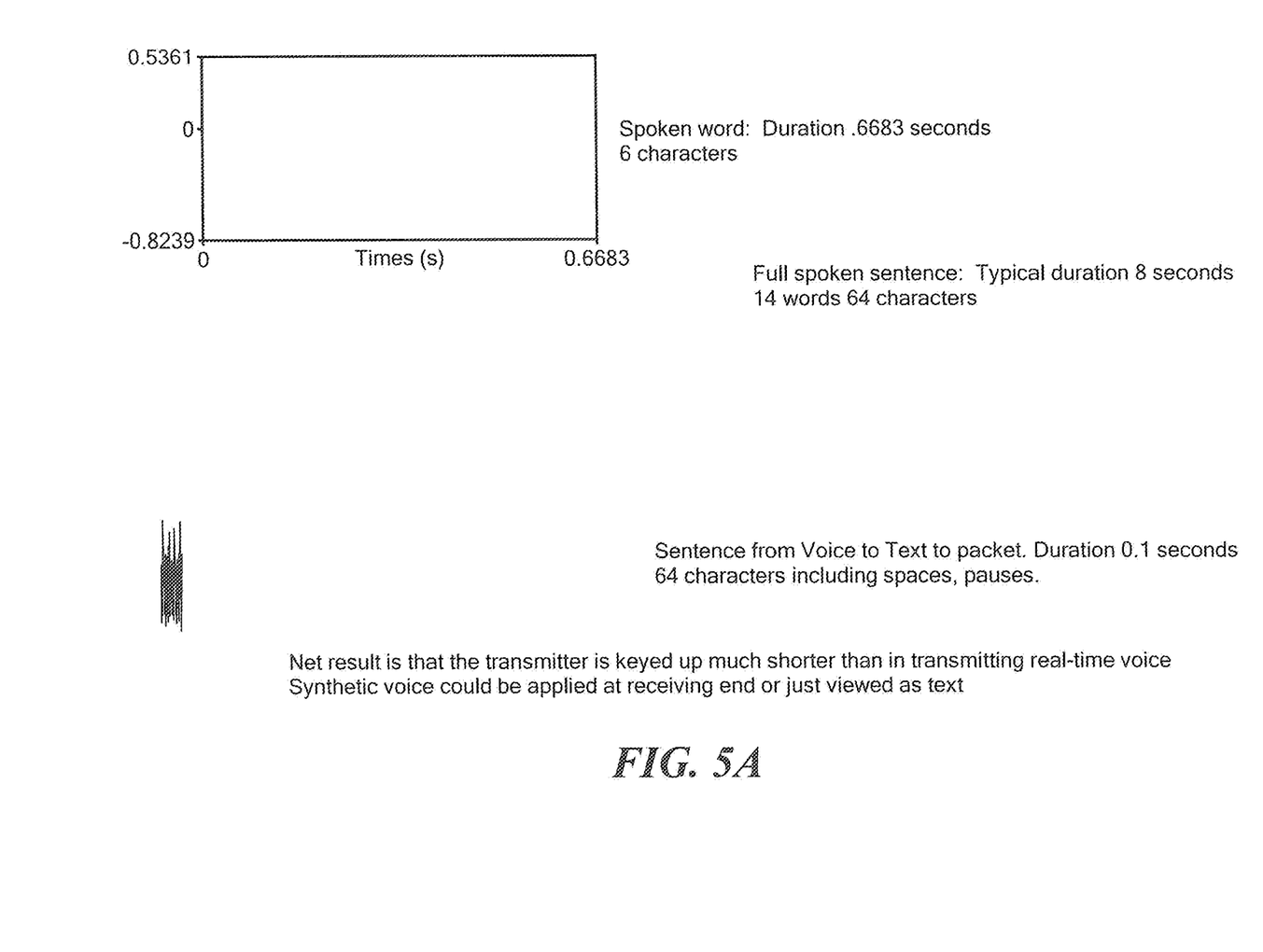
FIG. 5A is a graphical representation of speech and voice-to-text.
Figure 5B:
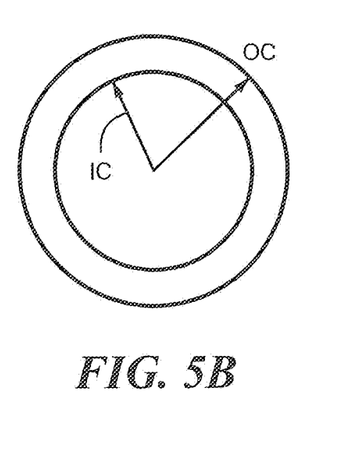
FIG. 5B is a schematic representation of concentric range circles.

It is understood that at the edge of information reliability, as shown for the outer range in FIG. 5B, last ditch operation involves multiple re-transmissions of the sent and received data. Contributing factors such as multi-path reception, interference sources, and polarization, for example, are not constant over time. Re-transmission of the information (distilled to text) multiple times with increased information reliability and net savings on power use are possible with data as compared with voice transmission. Increased information reliability in the outer annulus of FIG. 5B for radio range provides a last-ditch capability: getting through at the maximum range with reliable (albeit distilled-information only, no voice as a last ditch measure).

FIG. 5 shows an illustrative flow providing enhanced information reliability. In step 500, a user (user A) takes some action to transmit a message. In step 502, a microphone receives speech from user A for processing from voice-to-text in step 504. In step 506, the text is transmitted by user A radio after optional text verification. In step 508, the message transmitted by user A radio is received by a radio operated by remote user B. The user B radio transmits a message indicator, such as a checksum, to the user A radio. In step 510, the checksum transmitted by user B and received by user A is compared to the checksum for the original message. In step 512, any error messages, such as non-matching checksum detection, are sent by user A to user B. In step 514, user B radio receives the error message(s) and retransmits the checksum for the data.

In step 516, user A receives the retransmitted checksum and confirms the message. Retransmission can continue until the message is confirmed as being received.

The savings in bandwidth and power consumption while achieving enhanced information reliability by transmitting text from voice as compared to voice will be readily appreciated. The message transmissions described above require significantly less power and bandwidth than sending one voice transmission. An illustrative voice-to-text engine can provide a 5000:1 time duration compression for voice such that message repeats can occur 2500 times for an original voice input from the user.

FIG. 5A shows a graphical representation of a spoken word having 6 characters with a duration of 0.6683 seconds, as well as full sentence with a duration of about 8 seconds for 14 words with a total of 64 characters. It is understood that the drawings may not be to scale. The sentence converted from voice-to-text has a transmission duration of 0.01 seconds for 64 characters including spaces and pauses. By converting voice to text, the transmitter is keyed up for significantly less time than for transmitting voice.

FIG. 5B shows a first range defined by inner circle IC and a second range defined by an outer circle OC. The inner circle IC has a 99% reliability range of first transmission of message. The outer circle OC has a 80% reliability range of first transmission of message. In the illustrated embodiment, the outer circle OC is radius 1.5 times the inner circle IC radius. The ratio of coverage is ((1.5)*2 or 2.25 increase in range area. Using re-transmission of short bursts, 80% reliability is increased to 99% reliability. As discussed above in FIG. 5, for example, checksums and data content can be compared with full messages built based on re-transmissions. It is understood that short burst refers to the packet transmission of the voice information, which is up to 5000:1 reduction from spoken word message time duration.

Figure 6:
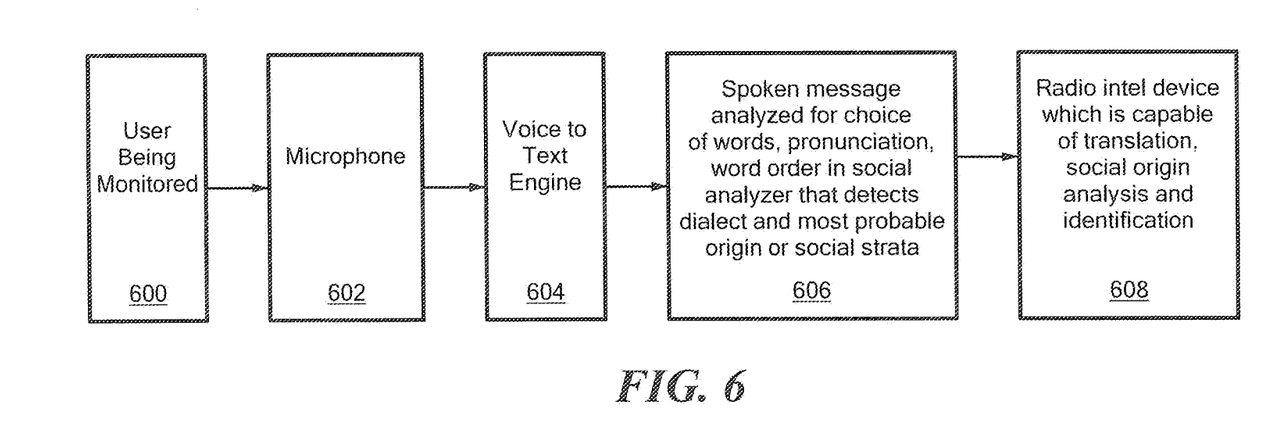
FIG. 6 is a flow diagram showing illustrative cognitive processing.

FIG. 6 shows an illustrative flow providing cognitive processing and situational awareness of transmitted messages. In step 600, a user may be monitored in a manner known or unknown to the user while taking action to send messages. In step 602, a microphone receives speech from user for processing from voice-to-text in step 604. In step 606, the text is analyzed, for example, based on word choice, pronunciation, dialect, and/or origin, social status, and the like. In step 608, the radio provides intel based on the analysis of the contextual analysis of the user speech text.

In embodiments, a tactical radio performs language analysis upon request or in continuous monitor mode. For example, in worldwide operations, military personnel may require widespread situational awareness when confronting non-combatants in adversarial or humanitarian situations. With increasing displacement of large populations from native lands, having local social analysis capability of conversation and/or intercepted speech increases situation awareness. Foreign combatants, displaced neutrals, and others may be attracted to neighboring lands, leaving military or other forces with tasks, such as international social/language/cultural interpreters.

In embodiments, one or more tactical radios with cognitive processing can gathering intelligence (in tactical situations) or better aid relief victims for humanitarian missions. In other embodiments, voice transmission alone, or in combination with voice-to-text data can enable remote analysis of intercepted voice. Whether processed locally or remotely, the output from processing of conversation or intercepted speech or interrogation can indicate likely country of origin, social alignment (strata), level of education, threat level, or other indicators of interest.

Figure 7:
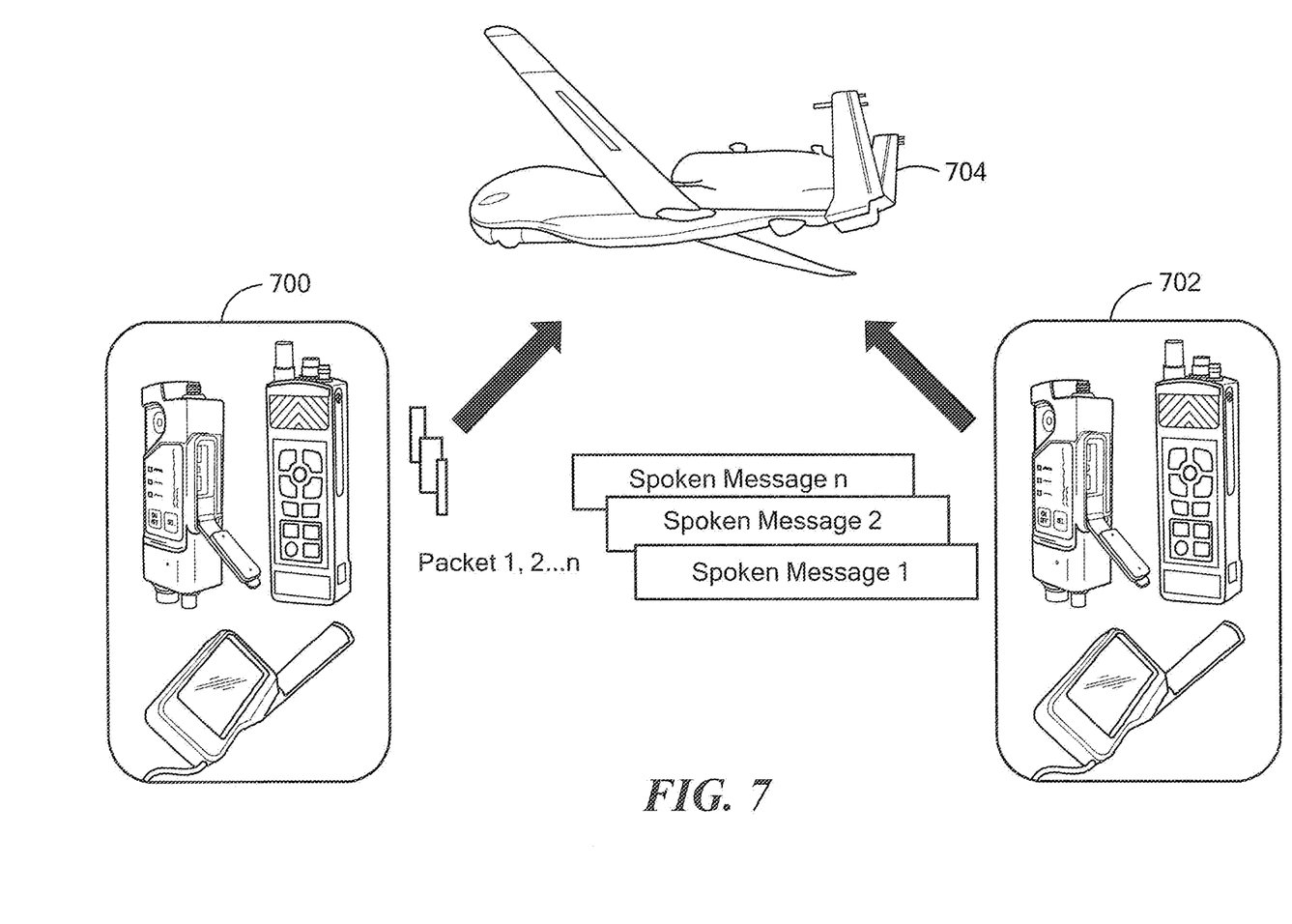
FIG. 7 is a schematic representation of an aircraft providing tactical radio transmission relay capability.

FIG. 7 shows a schematic representation of one or more radios 700 coupled to other radios 702 via aerial communication provide by an aircraft 704. It is understood that tactical radios may have a limited range. For example, tactical radio performance may be impacted by terrains, such as hills, so that a user on one side of a hill may not be able to communicate with a user on the other side of the hill. The aircraft 704 can include relay capability to enable radios 700 to communicate with the other radios 702. In one particular embodiment, the aircraft relay system can enable users of the radios 700, 702 to call in close air support without undesirable miscommunication.

Figure 8:
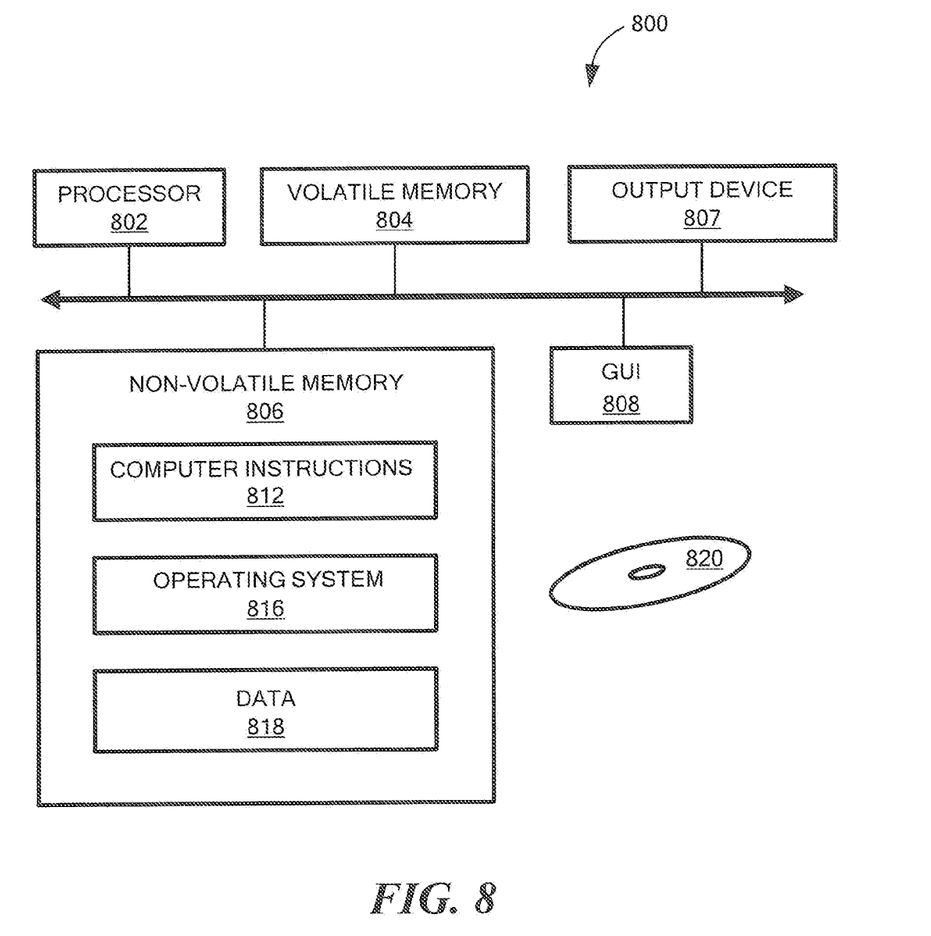
FIG. 8 is a schematic representation of an illustrative computer than can perform at least a portion of the processing described herein.

FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
receiving speech from a user in a microphone of a tactical radio having a processor and memory;
converting the speech to text with a voice-to-text module using the processor;
providing the text to the user for verification by the user;
receiving an indication from the user for verification that the text corresponds to the speech;
transmitting the text from the tactical radio; and
performing last ditch operation for the text transmitted from the tactical radio, wherein the last ditch operation involves multiple re-transmissions of the text.

2. The method according to claim 1, wherein providing the text comprises displaying the text on a screen.

3. The method according to claim 1, wherein providing the text comprises performing text-to-speech (TTS) for output from a loudspeaker of the tactical radio for verification of the speech received in the microphone of the tactical radio.

4. The method according to claim 1, further including translating the text from a first language to a second language.

5. The method according to claim 1, further including receiving a message from a device that received the transmitted text and analyzing the message to confirm receipt of the text.

6. The method according to claim 5, wherein the message includes a checksum corresponding to the text.

7. The method according to claim 5, further including detecting an error from the message from the device and retransmitting the text to the device.

8. The method according to claim 5, further including retransmitting the text until receiving a message indicating correct receipt of the text.

9. The method according to claim 1, further including performing cognitive processing of the text and gather intelligence information based on the cognitive processing of the text, wherein the cognitive processing comprises analyzing the text based on word choice, pronunciation and/or dialect and the intelligence information indicates at least one of likely country of origin, social alignment, level of education and threat level of the user.

10. The method according to claim 1, further including transmitting the text from the tactical radio and receiving a response from a further radio via an aircraft having relay capability.

11. The method according to claim 1, wherein link margin, transmission reliability and power are conserved during the last ditch operation.

12. The method according to claim 1, wherein the last ditch operation relies on repeated queries or hails.

13. The method according to claim 1, wherein the re-transmissions of the text during the last ditch operation are based on multi-path reception, interference sources and polarization.

14. The method according to claim 1, wherein the text includes a rendezvous point, time, and/or current location information, and wherein the current location information includes latitude, longitude and altitude information.

15. A radio, comprising:
a processor and memory configured to:
receive speech from a user in a microphone of the radio;
convert the speech to text with a voice-to-text module using the processor;
display the text to the user for verification by the user;
receive an indication from the user for verification that the text corresponds to the speech; and
transmit the text from the radio; and
perform last ditch operation for the text transmitted from the radio, wherein the last ditch operation involves multiple re-transmissions of the text,
wherein the text is transmitted periodically and/or randomly in accordance with the last ditch operation.

16. The radio according to claim 15, wherein the processor and memory are further configured to format the text for text-to-speech (TTS) output from a loudspeaker of the radio for verification of the speech received in the microphone of the radio.

17. The radio according to claim 15, wherein the processor and memory are further configured to translate the text from a first language to a second language.

18. The radio according to claim 15, wherein the processor and memory are further configured to receive a message from a device that received the transmitted text and analzye the message to confirm receipt of the text.

19. An article, comprising:
a non-transitory computer readable medium having stored instructions that enable a machine to:
receive speech from a user in a microphone of a tactical radio having a processor and memory;
convert the speech to text with a voice-to-text module using the processor;
display the text to the user for verification by the user;
receive an indication from the user for verification that the text corresponds to the speech;
transmit the text from the tactical radio; and
perform last ditch operation for the text transmitted from the tactical radio, wherein the last ditch operation involves multiple re-transmissions of the text.

* * * * *